Oct. 21, 1941.  G. R. JOHNSON  2,259,750
CUTTER BAR CONSTRUCTION
Filed Nov. 8, 1939  2 Sheets-Sheet 1
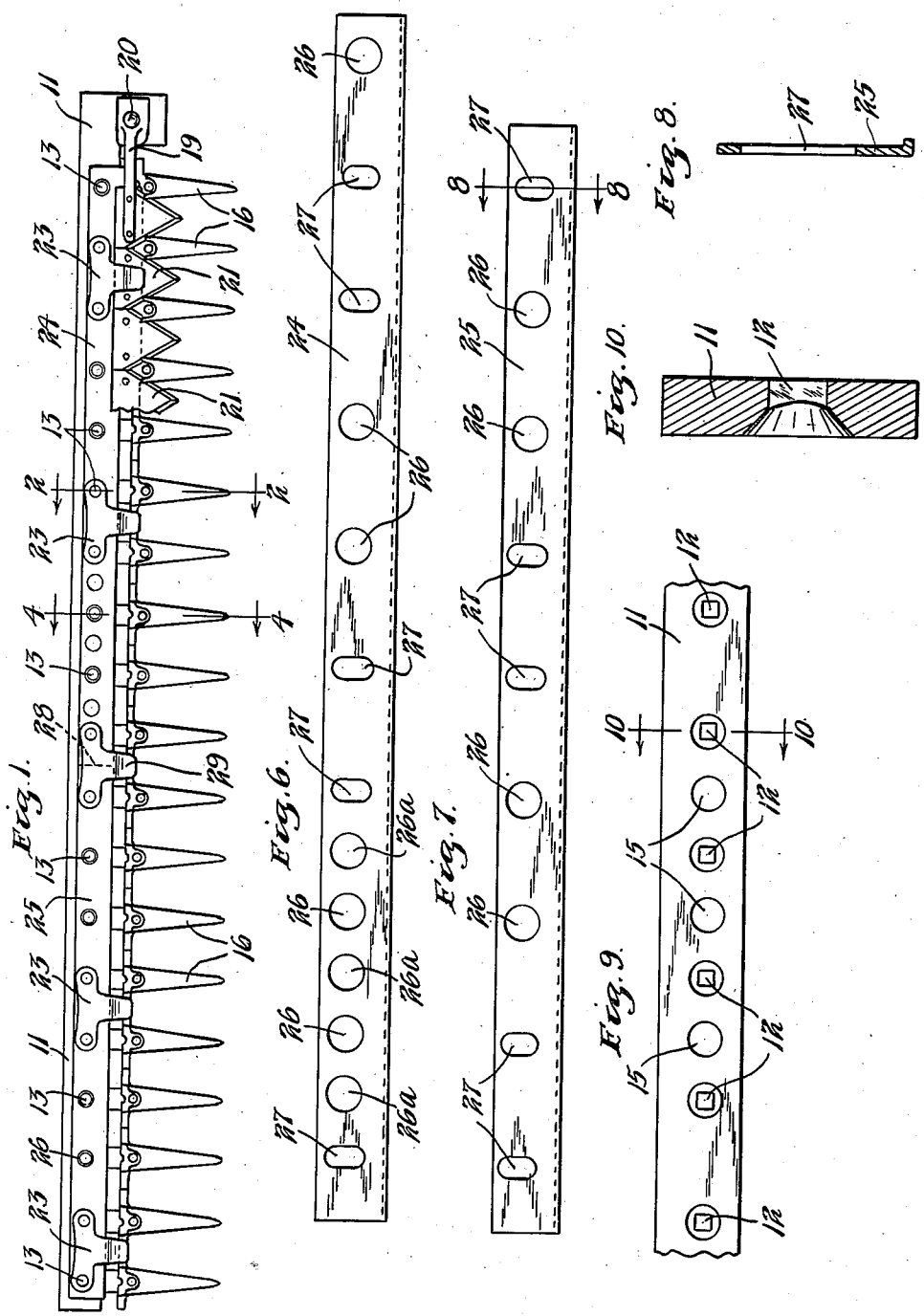
INVENTOR.
GUY R. JOHNSON.
BY HIS ATTORNEYS.
Williamson & Williamson Oct. 21, 1941.  G. R. JOHNSON  2,259,750
CUTTER BAR CONSTRUCTION
Filed Nov. 8, 1939  2 Sheets-Sheet 2
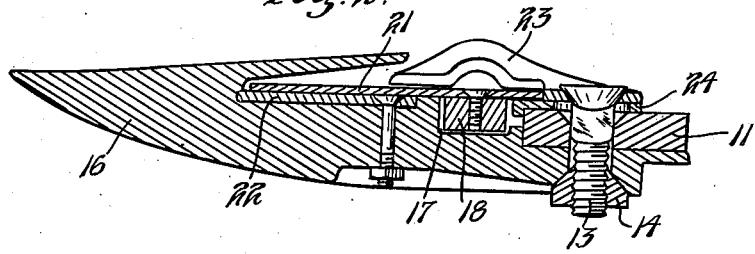
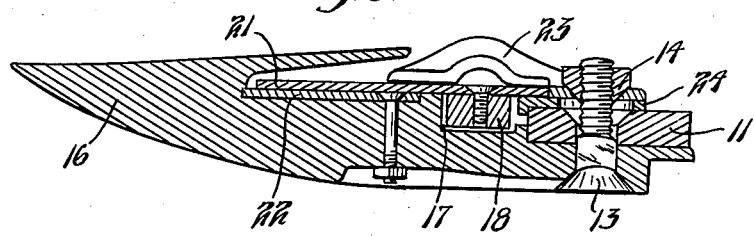
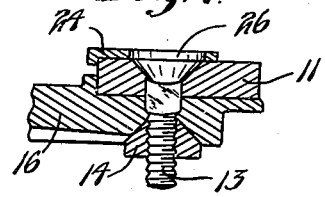
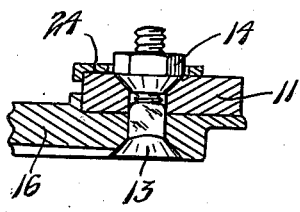
INVENTOR.
GUY R. JOHNSON.
BY HIS ATTORNEYS.
Williamson & Williamson Patented Oct. 21, 1941

2,259,750

UNITED STATES PATENT OFFICE 2,259,750

CUTTER BAR CONSTRUCTION

Guy R. Johnson, Rochester, Minn.

Application November 8, 1939, Serial No. 303,438

1 Claim. (Cl. 56—298)

This invention relates to cutter bar units and more particularly to improvements in sickle assemblies.

It has been previously customary to provide mowing machinery with a sickle bar carrying guards and ledger plates and a sickle knife carrying a plurality of cutting blades and adapted to reciprocate relative to the sickle bar, guards, and ledger plates. The sickle knife is reciprocated by a pitman and there is considerable pressure exerted vertically at an angle to the sickle knife and wear plates have been inserted between the sickle bar and the reciprocating sickle knife with its cutting blades. These wear plates have been made in a plurality of short sections at spaced intervals along the sickle bar. However, they were unsatisfactory from the standpoint of clogging with dirt and vegetable fibres as well as vegetable gums. The spaces between the wear plate sections accumulated large amounts of these objectionable materials and it worked down beneath the cutter blades and interfered with the movement of the sickle knife with said blades thereon.

Recently wear plates have been made in one piece as in Patent No. 2,149,347 to W. A. Johnson. The one piece wear plate overcame the difficulties encountered with the spaced sectional plates, but when the one piece plate becomes worn to the extent that it must be replaced, it, of course, results in replacement of the wear plate throughout the entire length of the sickle bar.

One of the objects of my invention is to provide a sickle wear plate preferably in two pieces with the adjacent ends of the sections in abutment so that the benefits of a continuous wear plate are obtained and at the same time it is possible to replace the inner section which much more quickly becomes worn due to its proximity to the pitman connection for reciprocating the sickle knife.

Another object of the invention is to provide a sectional wear plate wherein the adjacent ends are interconnected or bridged by one of the conventional knife clips which is supported by the sickle bar and bears upon the upper face of certain of the cutter blades to hold them in proper cutting relation to the ledger plates.

Another object of the invention is to provide a sickle assembly wherein the bolts which connect the guards to the sickle bar as well as securing the guard plate and knife clips are non-rotatably mounted to facilitate attachment and detachment of the various units of the assembly.

Still another object of the invention is to provide bolts and bolt openings in the various interconnected parts which can be inserted from either the upper or lower side of the assembly and be non-rotatably held to facilitate mounting and dismounting of the various parts.

Still a further object of the invention is to provide a combination of sickle bar and wear plate with openings to receive the above mentioned bolts and with said openings so arranged that the wear plates and sickle bars are adapted for use universally with respect to the several individual types of commercial structures.

These and other objects and advantages of the invention will more fully appear from the following description made in connection with the accompanying drawings, wherein like reference characters refer to the same parts throughout the views, and, in which:

Fig. 1 is a plan view of a mower or cutter assembly embodying my invention;

Fig. 2 is a section taken approximately on the line 2—2 of Fig. 1;

Fig. 3 is a section taken on the same line as that in Fig. 2 with the assembly bolt reversed;

Fig. 4 is a section taken substantially on the line 4—4 of Fig. 1;

Fig. 5 is a section taken on the same line as that in Fig. 4 with the assembly bolt reversed;

Fig. 6 is a plan view of the inner wear plate section;

Fig. 7 is a plan view of the outer wear plate section;

Fig. 8 is a typical section such as on the line 8—8 of Fig. 7;

Fig. 9 is a fragmentary plan view of a portion of the sickle bar lying beneath the outer end of the inner wear plate section; and Fig. 10 is a typical section such as that taken on the line 10—10 of Fig. 9.

In the drawings there is shown a sickle bar 11 which is adapted to be connected to the mowing machine in any suitable manner and said sickle bar is provided with a plurality of openings 12 to receive bolts 13 having nuts 14 threaded thereon. At one portion of the sickle bar there is also located a plurality of preferably circular openings 15 which will be described in more detail. The sickle bar has extending laterally therefrom at spaced points a plurality of conventional guards 16 which have openings adapted to register with openings 12 in the sickle bar and which are secured thereto by the bolts 13.

The guards 16 are provided with aligned cutouts 17 which are adapted to receive a reciprocating sickle knife 18. The inner end or righthand end of the sickle knife as viewed in Fig. 1 is provided with a knife head 19 which includes a ball 20 adapted to connect with an oscillating pitman as is well known in the art. The sickle knife 18 has a plurality of cutter blades 21 mounted thereon, said cutter blades acting in cooperation with relatively stationary ledger plates 22 which are supported by the guards 16. The cutter blades and ledger plates are of conventional structure as are the usual knife clips 23 which are supported by the sickle bar and act to hold the cutter blades in proper shearing relation to the ledger plates.

Mounted directly upon the upper face of the sickle bar 11 and extending around the forward upper corner thereof is a wear plate unit comprising a pair of sections 24 and 25. The inner and outer sections 24 and 25 which constitute the wear plate unit are provided with a plurality of circular openings 26 and also a plurality of elongated openings 27 which preferably have parallel straight sides as shown. The inner wear plate section 24 adjacent its outer end is also provided with several auxiliary circular openings 26a and while three such openings are shown the exact number thereof is not of particular importance.

The wear plate sections 24 and 25 as shown lie on the top of the sickle bar and beneath the rear edges of the cutter blades 21. The downturned forward edges of the wear plates lie between the adjacent edges of the sickle bar and the reciprocating sickle knife 18. When the cutter guards 16 are placed in position as indicated in Fig. 1 the wear plate sections and the sickle knife and blades are properly positioned as are the spaced knife clips 23. The clips 23 are placed upon those of the bolts 13 which extend through the combined tapered and squared openings 12 in the sickle bar and the elongated openings 27 in the wear plate sections 24 and 25. The openings 27 are elongated to permit adjustable mounting of the knife clips with respect to the cutter blades 21. As is clearly shown in Fig. 1 the wear plate sections 24 and 25 constitute a substantially continuous wear plate from one end of the sickle bar to the other. The wear plate is in sections and their adjacent ends are in abutment as indicated by the dotted line 28 in Fig. 1 so that there are no pockets or spaces between the ends of the sections as in the above mentioned old type of wear plate unit and consequently no dirt, fibres or gum can accumulate and the sickle knife is protected against jamming with respect to the notches 17 cut in the knife guards 16 in which said sickle knife reciprocates.

The center knife clip 29 is exactly similar in construction to the remaining clips 23, but it is separately designated since this clip performs an additional important function which is not found in the clips 23. As shown in Fig. 1, the clip 29 is connected between the adjacent ends of the wear plate sections so that said ends will be firmly held down against the sickle bar and maintained in positive abutting relationship. Thus the practical effect of the wear plate unit is that of a continuous one piece wear plate such as shown in the above identified patent while at the same time it is possible to remove and replace the inner wear plate section 24 without replacing the outer section 25. The inner section is subject to considerably greater wear than the outer section for the reason that it is beneath those cutter blades 21 which lie closest to the pitman ball connection 20 and knife head 19. It is at this inner end of the sickle knife that the vertical forces from the pitman are principally exerted. These vertical forces are practically negligible throughout the outer portions of the sickle bar and knife and consequently the outer wear plate section will last for a much longer time. The inner wear plate section 24 is shown somewhat longer than the outer section. The exact relative lengths of these sections is not essential but it is preferred that the inner section be made slightly longer so that the excessive wear at and in the inner end of the assembly will be adequately taken up by the inner wear plate member.

The sickle bar 11 as stated above is provided with a plurality of spaced openings 12, the upper portions of said openings being tapered or countersunk and the lower portions preferably being squared as best shown in Figs. 9 and 10. Thus when the bolts 13 are inserted through the sickle bar from the top face thereof the tapered heads of said bolts between the knife clips will lie in the tapered portions of the openings 12 as best illustrated in Fig. 4. The openings in the knife guards 16 are tapered in their lower portions and preferably squared in their upper portions in a reverse manner to the openings in the sickle bar 11. Therefore, if it is more convenient to insert the bolts 13 from the bottom through the guards and then upwardly through the sickle bar the countersunk portions of the bolts will lie in the countersinks or tapered portions of the guard openings and the nuts 14 are tapered to fit in the countersinks comprising portions of the openings 12 in the sickle bar. In Fig. 4 with the bolt extending downwardly from the sickle bar the squared shank portions of the bolts will extend through the squared portions of the openings 12 and also through the squared portions in the openings in the knife guards 16. These squared bolt shank portions also lie in the squared portions in the openings in the sickle bar and guards when the bolt is inverted as illustrated in Fig. 5. Therefore, it is possible to insert the bolts in either manner and they will be held against rotation to greatly facilitate assembly and dismantling of the mower unit, it being unnecessary to hold the bolt with a screw driver or wrench when the nut is being tightened or loosened.

In Figs. 2 and 3 the bolts 13 are shown in upright and inverted positions and in these views the clips 23 are also shown. In Fig. 2 the bolt extends downwardly through the clip and sets in the clip opening and then extends through one of the openings 27 in the wear plate units with the lower portion of the squared shank above the threads in engagement with the squared opening portion in the sickle bar 11. In Fig. 3 the bolt is inserted upwardly through the knife guard 16, the sickle bar 11, the wear plate and clip 23 with the squared shank portion of the bolt lying in the squared portions of the openings through the guards and sickle bar.

From the foregoing description it will be seen that I have provided a mower assembly wherein I secure all of the benefits of a continuous wear plate from one end of the sickle bar to the other while at the same time providing a removable inner section which can be replaced without replacing the outer section so that approximately half of the cost of replacement of a worn wear plate is saved. The abutting ends of the wear plate sections eliminate any pockets or spaces which would otherwise permit the accumulation of dirt, grass and other substances, and the center knife clip 29 connects the adjacent ends of the two sections and firmly holds them flat against the upper face of the sickle bar. The wear plate connecting or bridging clip 29 is spaced outwardly from the inner end of the sickle assembly and it is greatly preferred that one or more clips 23 be positioned between the clip 29 and the inner end of the sickle unit so that they will assist in keeping the sickle knife relatively flat and straight and relieve the bridging clip 29 of most of the vertical stresses imposed on the sickle knife by the reciprocating drive connection.

The wear plate and sickle bar openings are so constructed in combination with the retaining bolts and their nuts that the bolts can be inserted from the top or bottom of the sickle assembly and the bolts are prevented from turning when the nuts are tightened or loosened. In addition the sickle bar and wear plate assembly are arranged with additional openings to permit almost universal attachment to different mower structures.

It will be understood that various changes may be made in the form, details, arrangement and proportions of the various parts without departing from the scope of my invention.

What is claimed is:

A cutter bar construction including a sickle bar, a plurality of guards secured to said bar, ledger plates supported by said guards, a sickle knife movable relative to said sickle bar and guards and having a drive connection at its inner end, a plurality of cutter blades mounted on said sickle knife for movement therewith and in sliding relationship to said ledger plates, a first wear plate section between said sickle bar and said cutter blades and extending from adjacent the inner ends of said sickle bar and knife to a point intermediate their ends, a second wear plate section abutting and extending from the outer end of said first section to the outer ends of said sickle bar and knife, and a knife clip secured to said sickle bar and connected between and bridging and holding down the adjacent ends of said two wear plate sections.

GUY R. JOHNSON.